United States Patent
Kobayashi (10) Patent No.: US 7,800,861 B2
(45) Date of Patent: Sep. 21, 2010

(54) CARTRIDGE MAGAZINE WITH SHUTTER OPENING MECHANISM

(75) Inventor: Yutaka Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 11/999,725

(22) Filed: Dec. 6, 2007

(65) Prior Publication Data
US 2008/0130164 A1   Jun. 5, 2008

Related U.S. Application Data (63) Continuation of application No. PCT/JP2005/010594, filed on Jun. 9, 2005.

(51) Int. Cl.
*G11B 15/68* (2006.01)
*G11B 17/22* (2006.01)

(52) U.S. Cl. .................. 360/92.1; 369/30.42

(58) Field of Classification Search ............ 369/30.53, 369/30.83, 30.42, 30.68; 360/92.1
See application file for complete search history.

(56) References Cited

U.S. PATENT DOCUMENTS

| | | | | |
|---|---|---|---|---|
| 5,247,406 A | * | 9/1993 | Apple et al. | 360/92.1 |
| 5,659,440 A | * | 8/1997 | Acosta et al. | 360/92.1 |
| 5,684,654 A | * | 11/1997 | Searle et al. | 360/92.1 |
| 5,718,339 A | * | 2/1998 | Woodruff | 211/41.12 |
| 5,940,243 A | * | 8/1999 | Kanetsuku et al. | 360/92.1 |
| 5,943,305 A | * | 8/1999 | Fitzgerald et al. | 369/30.42 |
| 6,042,205 A | * | 3/2000 | Coffin et al. | 312/332.1 |
| 6,353,581 B1 | * | 3/2002 | Offerman et al. | 369/30.4 |
| 6,580,582 B1 | * | 6/2003 | Caverly | 360/92.1 |
| 7,292,405 B2 | * | 11/2007 | Brace et al. | 360/92.1 |
| 7,312,947 B2 | * | 12/2007 | Jansen et al. | 360/92.1 |
| 2003/0039180 A1 | * | 2/2003 | Mueller et al. | 369/30.41 |
| 2008/0130164 A1 | * | 6/2008 | Kobayashi | 360/92.1 |

FOREIGN PATENT DOCUMENTS

| | | |
|---|---|---|
| JP | 8-329582 | 12/1996 |
| JP | A 9-212977 | 8/1997 |
| JP | 10-162461 | 6/1998 |
| JP | 2005-32355 | 2/2005 |

OTHER PUBLICATIONS

Partial machine English translation of JP08-329582 (document provided by applicant); Sofue Masaaki, pp. 1-11.*

* cited by examiner

*Primary Examiner*—Brian E Miller
(74) *Attorney, Agent, or Firm*—Greer, Burns & Crain, Ltd.

(57) ABSTRACT

The cartridge magazine according to the present invention has a plurality of holding shelves holding a plurality of cartridges, each holding shelf being provided with a shutter opening mechanism for opening a shutter of a cartridge along with insertion of a cartridge. Furthermore, it is provided with a shutter check door having projection parts projecting out into spaces formed by the opening of the shutters.

7 Claims, 13 Drawing Sheets

Fig.13 ic # CARTRIDGE MAGAZINE WITH SHUTTER OPENING MECHANISM

CROSS REFERENCE TO RELATED APPLICATION

This application is a continuation application and is based upon PCT/JP2005/010594, filed on Jun. 9, 2005.

TECHNICAL FIELD

The present invention relates to a cartridge magazine able to house a plurality of cartridges storing storage media and a cartridge library apparatus for setting the magazines and enabling loading and unloading of cartridges.

BACKGROUND ART

In recent years, there has been a growing need for backing up huge amounts of data such as images or moving pictures. Demand has also been growing for media library apparatuses housing large numbers of cartridges containing storage media. For example, tape library apparatuses house large numbers of tape cartridges and can back up large amounts of data at high speed. A tape library apparatus is provided with a plurality of tape drives for writing and reading data to and from the tapes and a conveyance robot for conveying the tape cartridges. It takes out the tape cartridges stored in storage cells in the apparatus by the conveyance robot, conveys them to and sets them in the tape drives, and writes or reads data to and from the tapes there.

To operate such a tape library apparatus, it is necessary to store a large number of tape cartridges in cells in the apparatus. The storage work is performed as follows using cartridge magazines able to hold pluralities of tape cartridges:

First, an operator loads a plurality of cartridges into a magazine.

Next, the operator sets the magazine holding the cartridges in a cartridge access station (CAS) of the tape library apparatus.

Finally, the conveyance robot stores cartridges in storage cells in the apparatus from the magazine set in the cartridge access station.

In this way, to store cartridges in a library apparatus, there is the work of the operator loading a plurality of cartridges into a magazine and loading that magazine into a cartridge loading unit. The cartridges have movable shutters covering the tape entrance/exit parts. Inside of the shutters, leader pins fastened to the front ends of the tapes are attached. Therefore, if an operator carelessly allows a cartridge to drop and gives a shock to the cartridge, the shutter may deform and no longer open or the leader pin may detach from the stopper and fall off. Further, in some cases there will be initial defects in the shutter or leader pin of a cartridge. Discerning such problems in the cartridges was difficult visually. Therefore, cartridge defects were first discovered only after the cartridges were set in the cells in the library apparatus and were conveyed to and set in the tape drives for writing or reading data to or from the tapes.

Note that in apparatuses using disk cartridges, an apparatus has been proposed which detects when a cartridge is loaded in a magazine backward, but this cannot detect cartridge defects as explained above.

Patent Document 1: Japanese Patent Publication (A) No. 9-212977

DISCLOSURE OF INVENTION

Problem to be Solved by the Invention

The present invention was made in consideration of the above problem and has as its object the provision of a cartridge magazine and cartridge library apparatus enabling detection of cartridge defects when setting a magazine housing cartridges in the library apparatus.

Means for Solving the Problem

A cartridge magazine according to the present invention has a plurality of holding shelves holding a plurality of cartridges storing storage media, each the holding shelf comprising a shutter opening mechanism for opening a shutter of a cartridge along with insertion of a cartridge. Further, it may be provided with a shutter check door having projection parts projecting out into spaces formed by the opening of the shutters.

A cartridge library apparatus according to the present invention is a cartridge library apparatus enabling cartridges to be loaded and unloaded using cartridge magazines each holding a plurality of cartridges storing storage media and provided with a shutter opening mechanism for opening a shutter of a cartridge along with insertion of a cartridge, wherein a cartridge access unit of the cartridge library apparatus comprises inspecting means for inspecting the insides of the cartridges through the opened shutters by noncontact means.

Each cartridge magazine may further have a shutter check member having projection parts projecting out into spaces formed by the opening of the shutters, and each cartridge access unit may be configured to prevent loading of the cartridge magazine, when even one shutter cannot be opened, by the nonopening shutter striking a projection part and the shutter check member thereby opening.

Each cartridge access unit may further be provided with a shutter check member opening means for opening the shutter check member of the loaded cartridge magazine, and the inspecting means may inspect the insides of the cartridges by noncontact means after the shutter check member is opened.

Effects of Invention

According to the present invention, it is possible to discover cartridge defects early and therefore possible to efficiently operate a cartridge library apparatus.

BRIEF DESCRIPTION OF THE DRAWINGS

FIG. 3(a), (b) are views showing a tape cartridge used in an embodiment of the present invention.

FIG. 7(a) is a view showing a side surface of a magazine facing shutters of the cartridges, while (b) is a view showing a top surface of the same.

FIG. 8(*a*) is a view showing a side surface of a magazine facing shutters of the cartridges and showing a state with the shutter check door open, while (*b*) is a view showing a top surface of the same.

FIG. 9(*a*) is a view showing the state with the shutter of a cartridge opened by engagement with a coil spring, while (*b*) is a view showing the state where the shutter of the cartridge is not opened even with engagement with the coil spring.

BEST MODE FOR CARRYING OUT THE INVENTION

Below, the drawings will be referred to so as to explain the best mode for carrying out the present invention.

Figure 1:
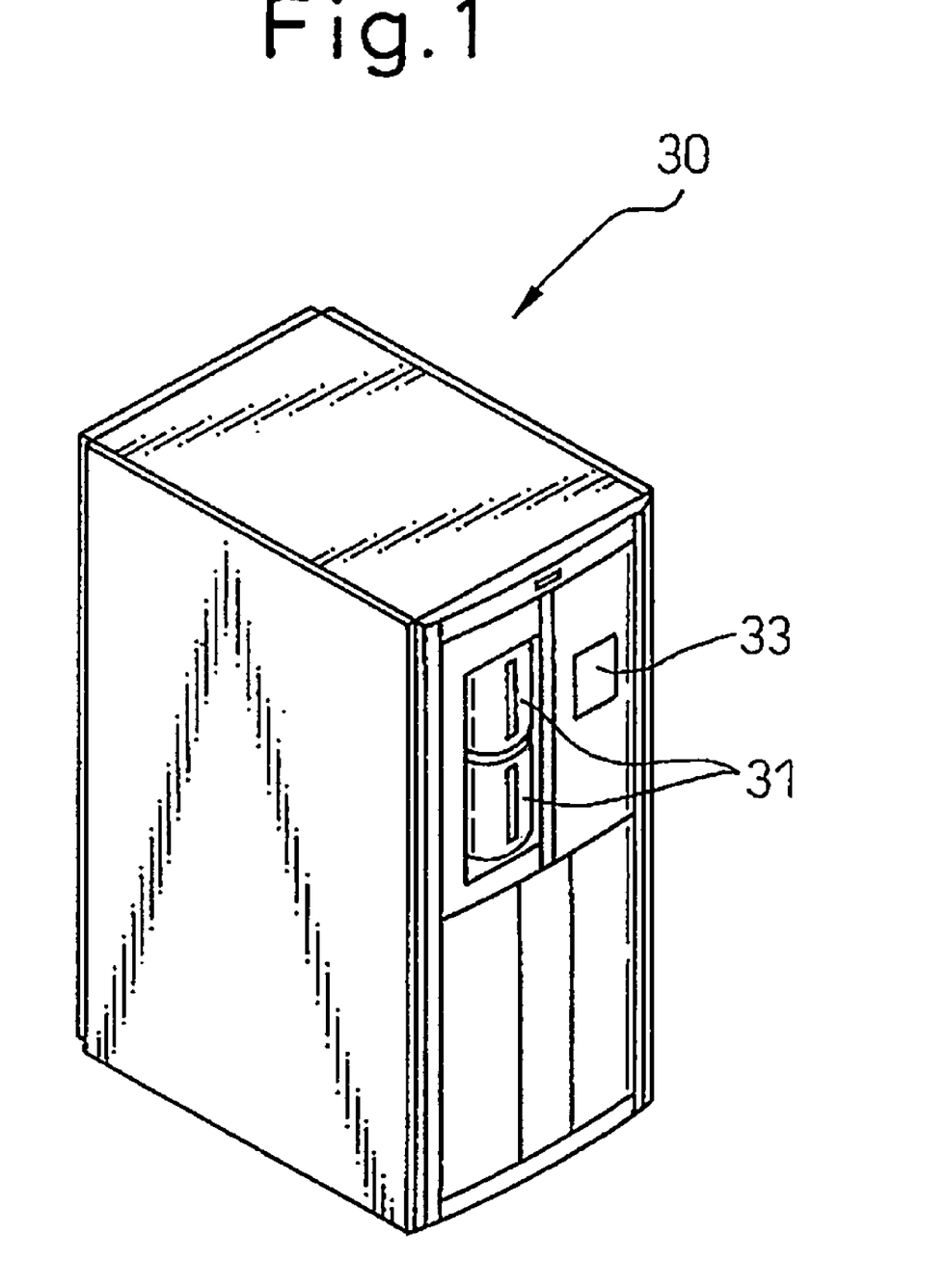
FIG. 1 is a view showing a tape library apparatus used in an embodiment of the present invention.

FIG. 1 shows a tape library apparatus 30 used in an embodiment of the present invention. At the top of the front surface, there are slots 31 called "cartridge access stations" (CAS) for insertion and removal of cartridges. Several cartridges are housed together in a magazine which is then set in a CAS. As illustrated, usually the doors of the CAS's are closed. When inserting or removing cartridges, the operator opens the corresponding door and sets the magazine. The operator can use an operator panel 33 to operate the library apparatus 30. For example, the operator operates the operator panel 33 to unlock the corresponding CAS door and opens the door manually. In this example, each CAS 31 is structured to enable a magazine holding five cartridges to be set. There are CAS's 31, so 10 cartridges can be inserted and removed.

Figure 2:
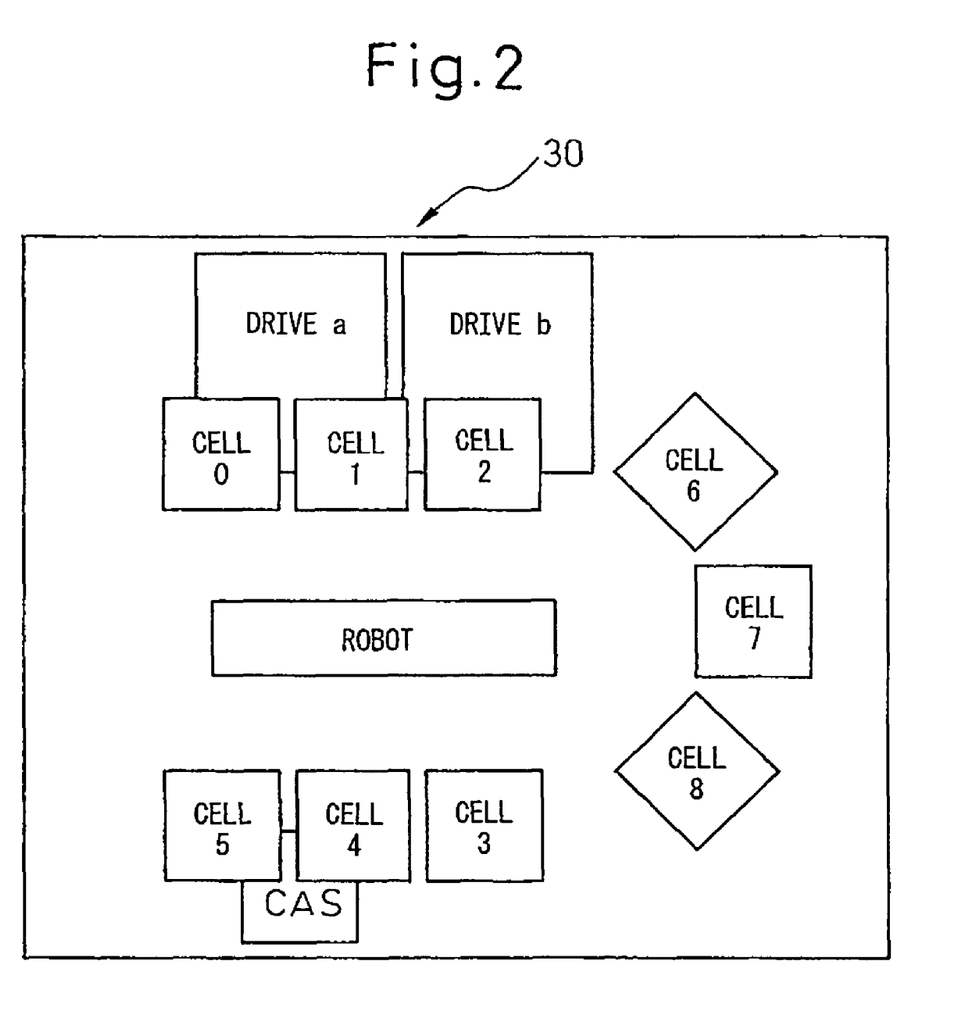
FIG. 2 is a view showing the internal configuration of a tape library apparatus.

FIG. 2 shows the internal configuration of the tape library apparatus 30. The library apparatus comprises CAS's, cells for storing the cartridges, tape drives for driving the tapes of the cartridges, and a robot conveyance system for conveying the cartridges. The cells 0 to 8 show cell lines. There are a total of about 100 to 300 cells. The drives a and b show drive lines. There are a total of about 10 to 20 drives. The cartridges in the magazines loaded into the CAS's are conveyed by the robot conveyance system to the cells for storing the cartridges. The cartridges stored in the cells are conveyed by the robot conveyance system to the drives where they are then set. At the drives, data is written on and read from the tapes.

Figure 3:
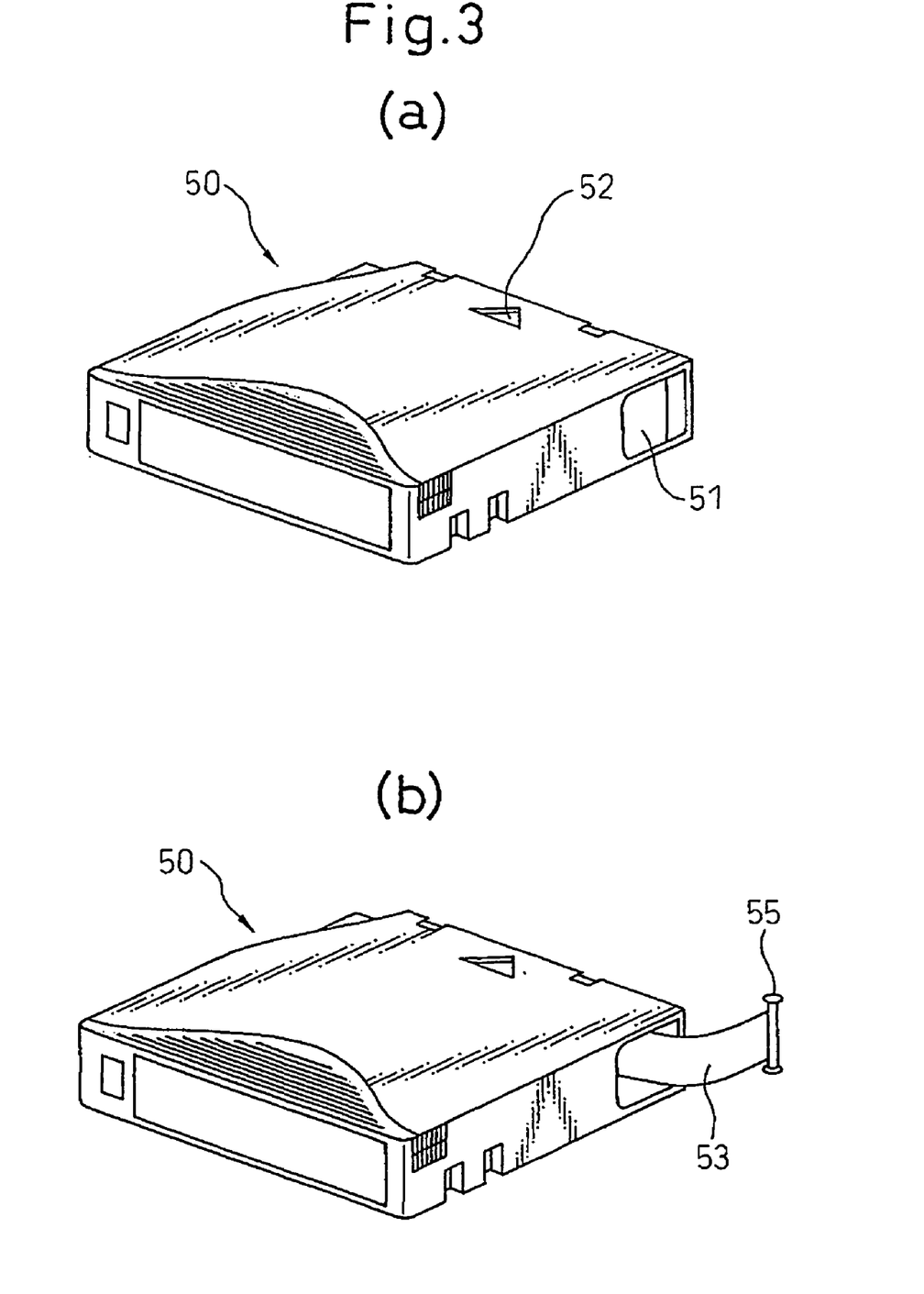
Figure 4:
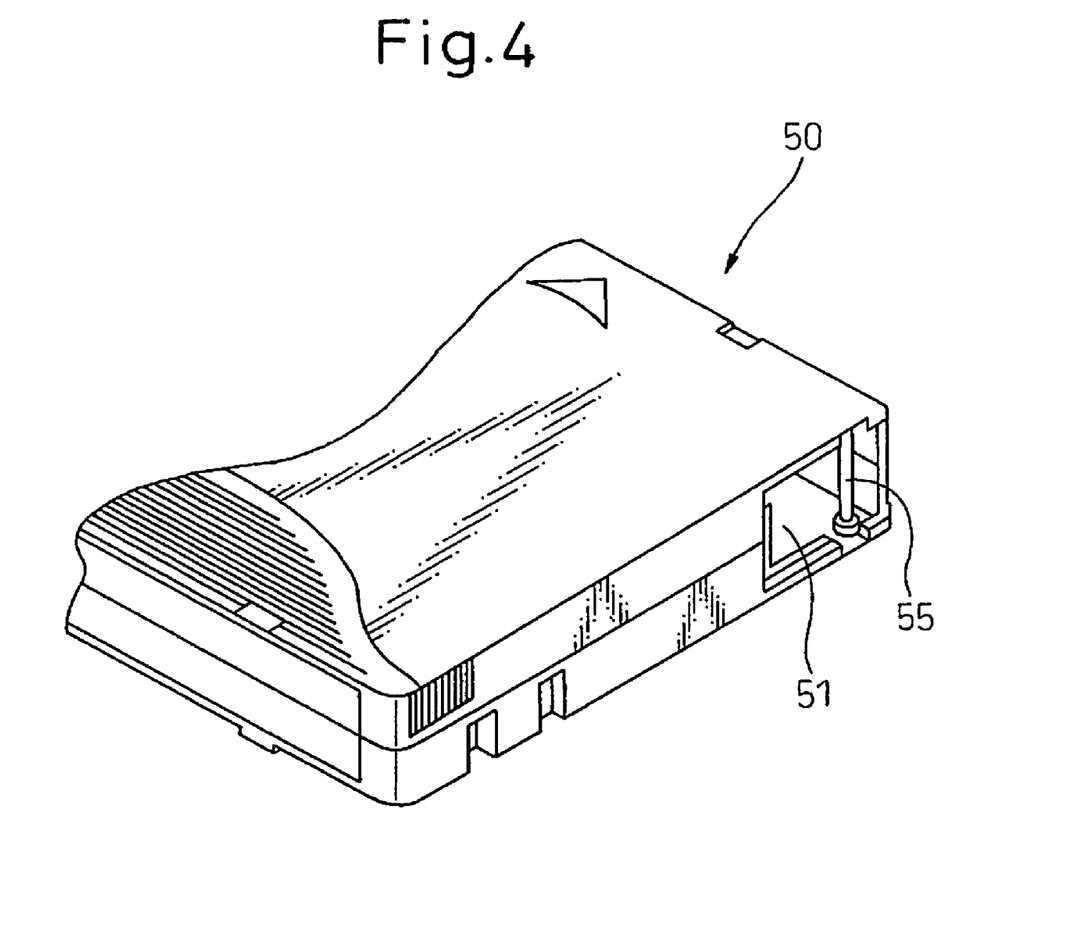
FIG. 4 is a view showing a leader pin fastened inside a tape cartridge.

FIGS. 3(*a*) (*b*) and FIG. 4 show a tape cartridge 50 used in an embodiment of the present invention. (a) shows the state in the middle of opening a shutter 51, while (b) shows the state where the shutter 51 is fully opened and tape is being pulled out. The cartridge is inserted into a magazine or inserted into a tape drive following an insertion direction mark 52 on the top surface of the cartridges 50. At the tape drive, the shutter 51 is opened, a leader pin 57 is gripped, and the tape 55 is pulled out. FIG. 4 shows a leader pin in the state fastened inside the cartridge 50 behind the shutter 51. Due to this structure, as explained above, shock given to the cartridge easily results in trouble such as the shutter 51 not opening or the leader pin 55 detaching.

Figure 5:
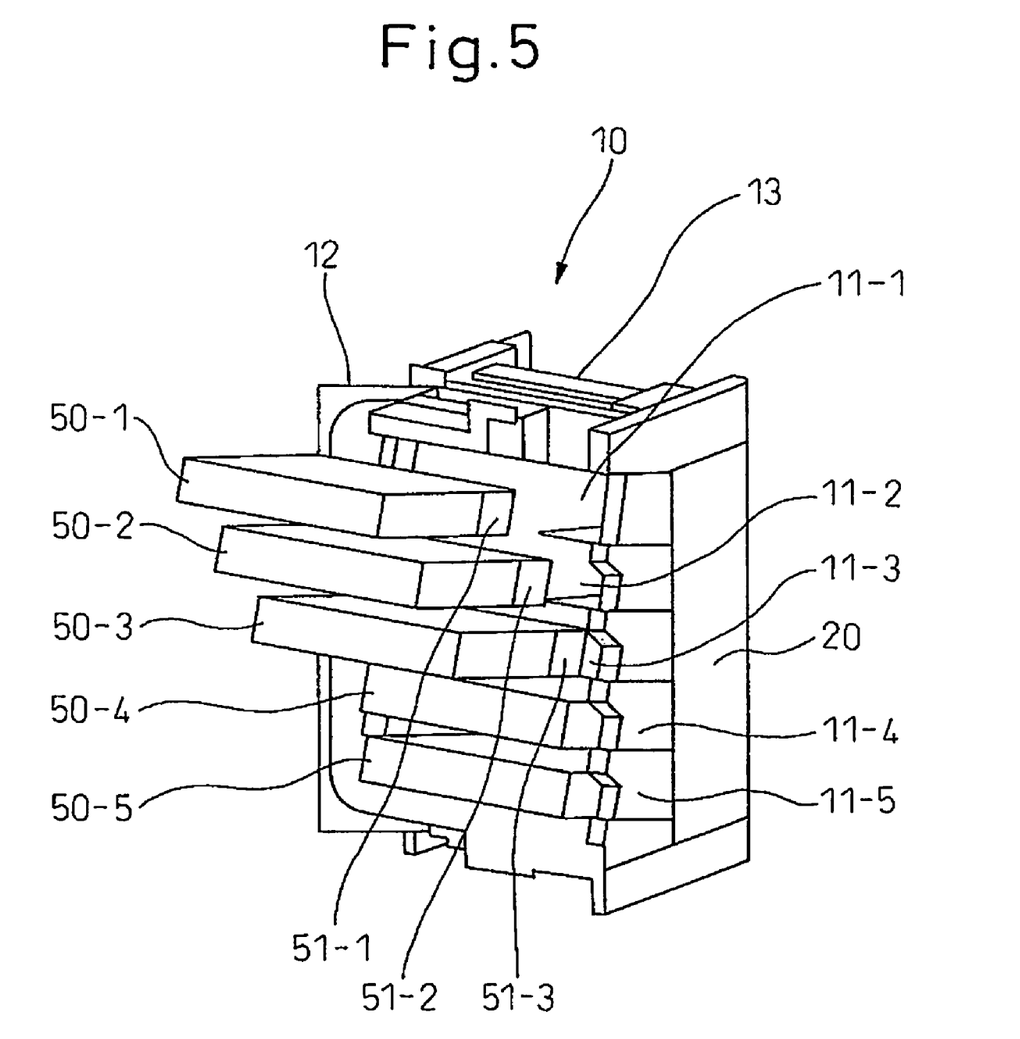
FIG. 5 is a view showing a cartridge magazine of an embodiment of the present invention.
Figure 6:
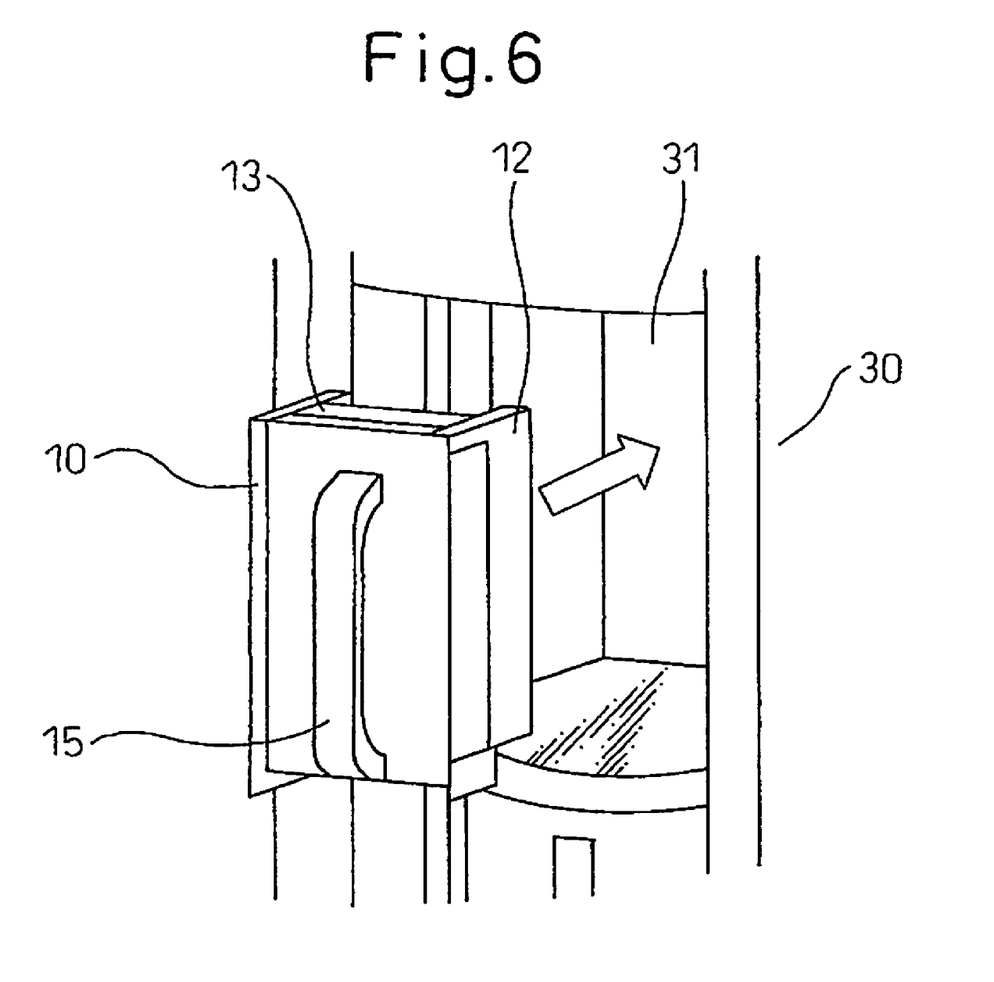
FIG. 6 is a view showing the setting of a magazine in a tape library.

FIG. 5 shows a magazine 10 holding cartridges according to an embodiment of the present invention, while FIG. 6 shows a magazine 10 being set into a tape library apparatus 30. The magazine 10 is provided with cartridge holding shelves 11-1 to 11-5, so five cartridges 50-1 to 50-5 can be stored. The cartridges 50-1 to 50-5 are inserted so that the shutters 51-1 to 51-5 are arranged at the back of the shelves. When inserting all of the cartridges 50-1 to 50-5, to prevent detachment of the cartridges, a cartridge detachment prevention lever 12 is swung to the back surfaces of the cartridges 50. Reference numeral 20 shows the location where a shutter defect detection mechanism according to the present invention is arranged. The shutter defect detection mechanism will be explained in detail later.

When cartridges 50 finish being housed in the cartridge magazine 10, the operator loads the magazine 10 into a CAS 31 by unlocking the door of the CAS 31 and manually opening the door of the CAS 31 of the tape library apparatus 30. Next, as shown in FIG. 6, a handle 15 for setting the magazine 10 in a CAS, provided at the opposite side to the cartridge insertion side, is gripped and the magazine 10 is loaded into the CAS 31. The cartridge detachment prevention lever 12 is released to the side of the magazine 10 when the magazine 10 is set in the CAS 31 so as to enable the cartridges 50 to be taken out. After the magazine 10 is loaded into the CAS 31, the door of the CAS 31 is closed, then the robot conveyance process is begun. Note that the handle 13 can be used when the operator carries around the magazine 10.

Figure 7:
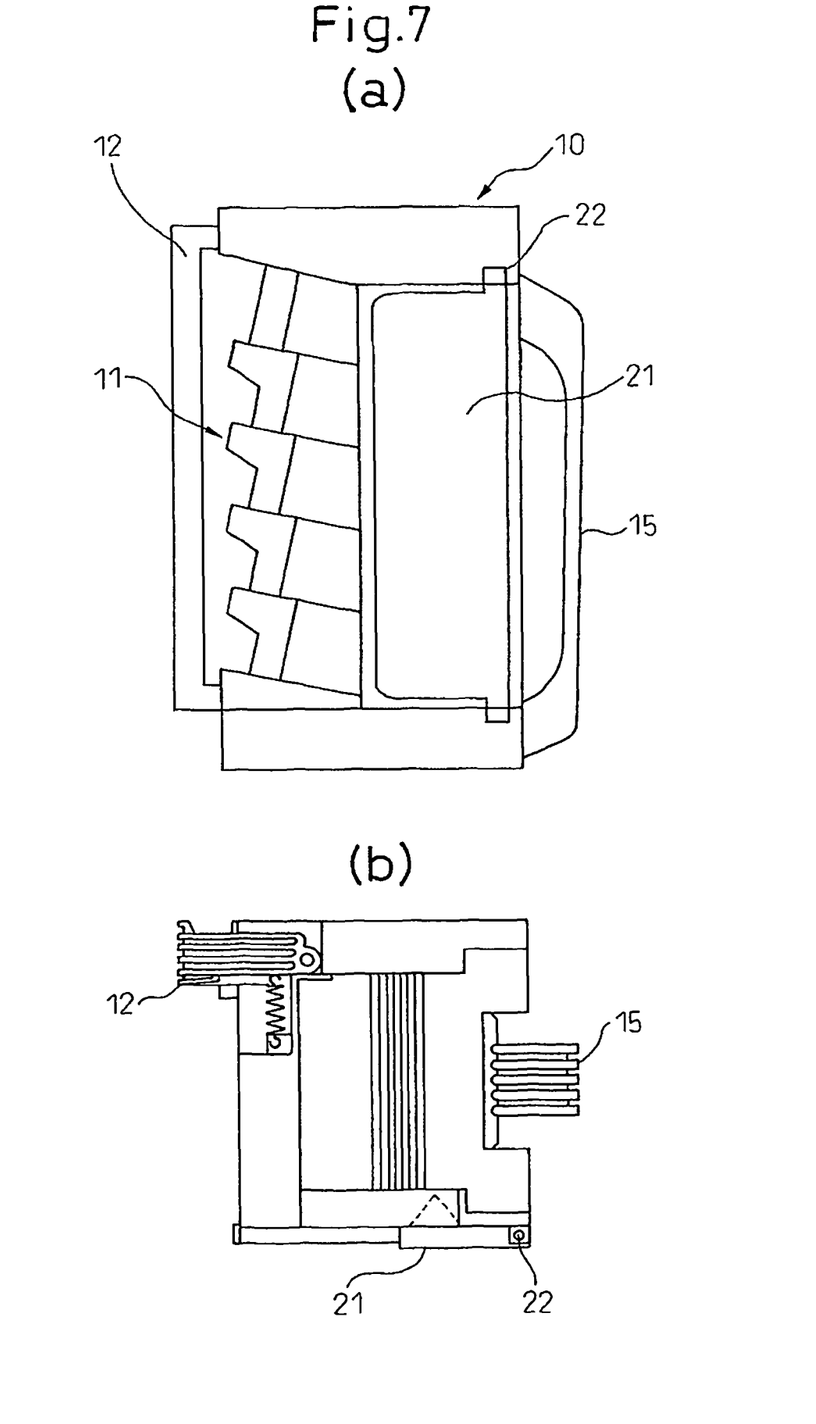
Figure 8:
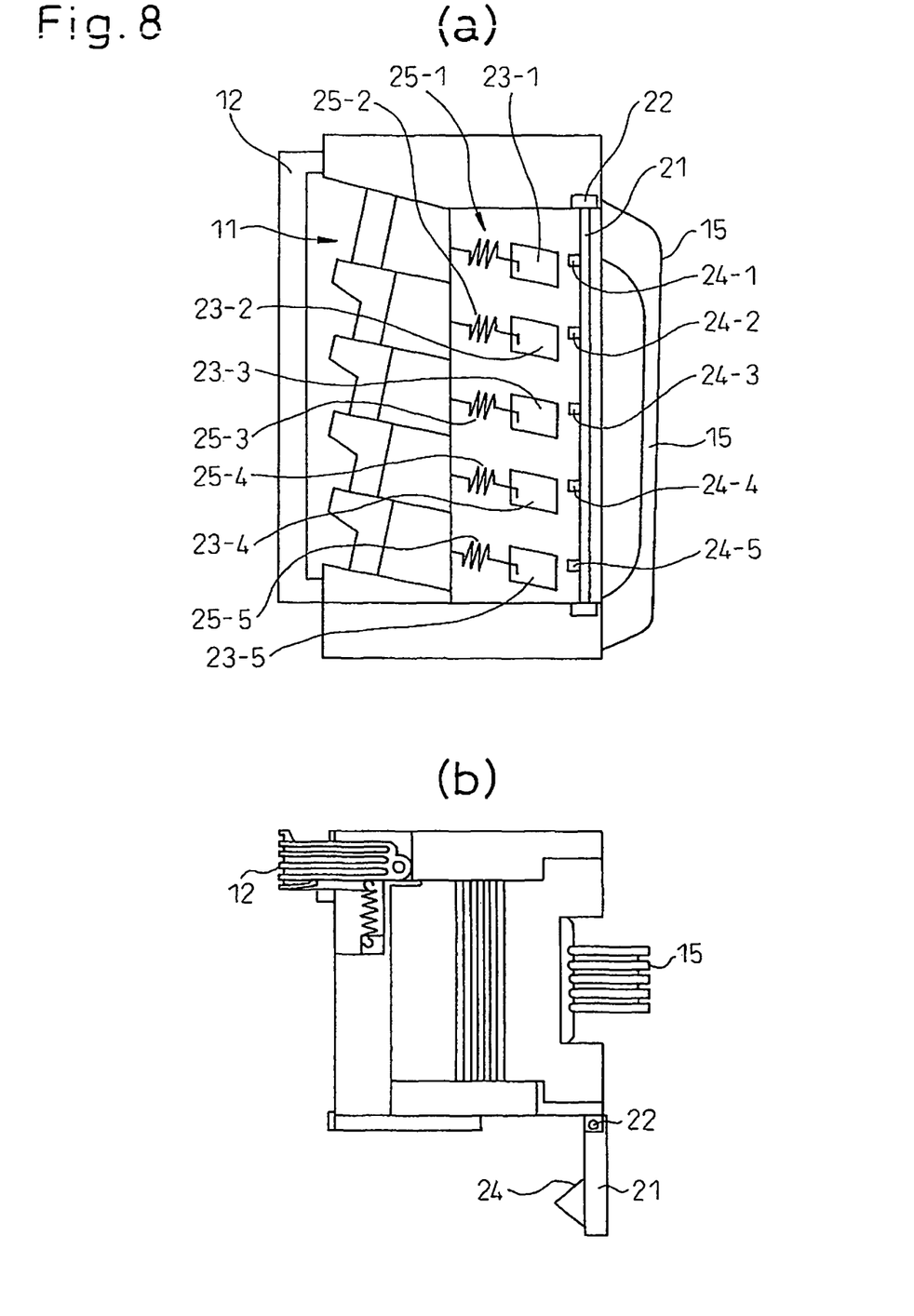

FIGS. 7(*a*) and (*b*) and FIGS. 8(*a*) and (*b*) show a shutter defect detector 20 provided at a magazine 10. FIG. 7(*a*) is a side view showing the state where a shutter check door 21 of the shutter defect detector 20 is closed, while FIG. 7(*b*) shows a top view of the same. The shutter defect detector 20 is provided at the side surface of the magazine facing the shutters 51 of the inserted cartridges 50. The shutter check door 21 of the shutter defect detector 20 is for judging whether the shutters of the cartridges normally open. The shutter check door 21 has a shaft 22 at the handle 15 side and is designed to open to the side by pivoting around the shaft 22. Further, while explained in detail later, the top surface of the shaft 22 has a groove cut into it. When the magazine 10 is normally set in a CAS 31 of the library apparatus 30, a member driven by a motor provided in the CAS 31 fits into the groove and enables the door 21 to be opened.

FIG. 8(*a*) shows the mechanism inside from the shutter check door by opening the shutter check door 21 to expose the inside mechanism. FIG. 8(*b*) is a top view of the same. Note that at the time of normal use, the shutter check door 21 is closed, However, when the magazine 10 is being set in a CAS 31 of the library apparatus 30, the shutter check door 21 is opened. As shown in FIG. 8(*a*), the side surface of the magazine 10 has openings 23-1 to 23-5 passing through the side wall of the magazine 10. These openings 23-1 to 23-5 are provided at positions corresponding to the shutters of the cartridges stored in the cartridges storing shelves 11. Further, coil springs 25-1 to 25-5 biased in the opposite direction to the insertion direction of the cartridges are provided. The front ends of the coil springs are bent and stick out slightly from the openings 23-1 to 23-5 so as to engage with the shutters 51-1 to 51-5. At the back surface of the shutter check door 21, projection parts 24-1 to 24-5 fitting into the openings 23-1 to 23-5 are provided corresponding to the openings 23-1 to 23-5. When cartridges 50 are not stored in the cartridge storing shelves 11 of the magazine 30, the projections 24 of the shutter check door 21 fit into the corresponding openings 23 and the shutter check door 21 is closed.

Figure 9:
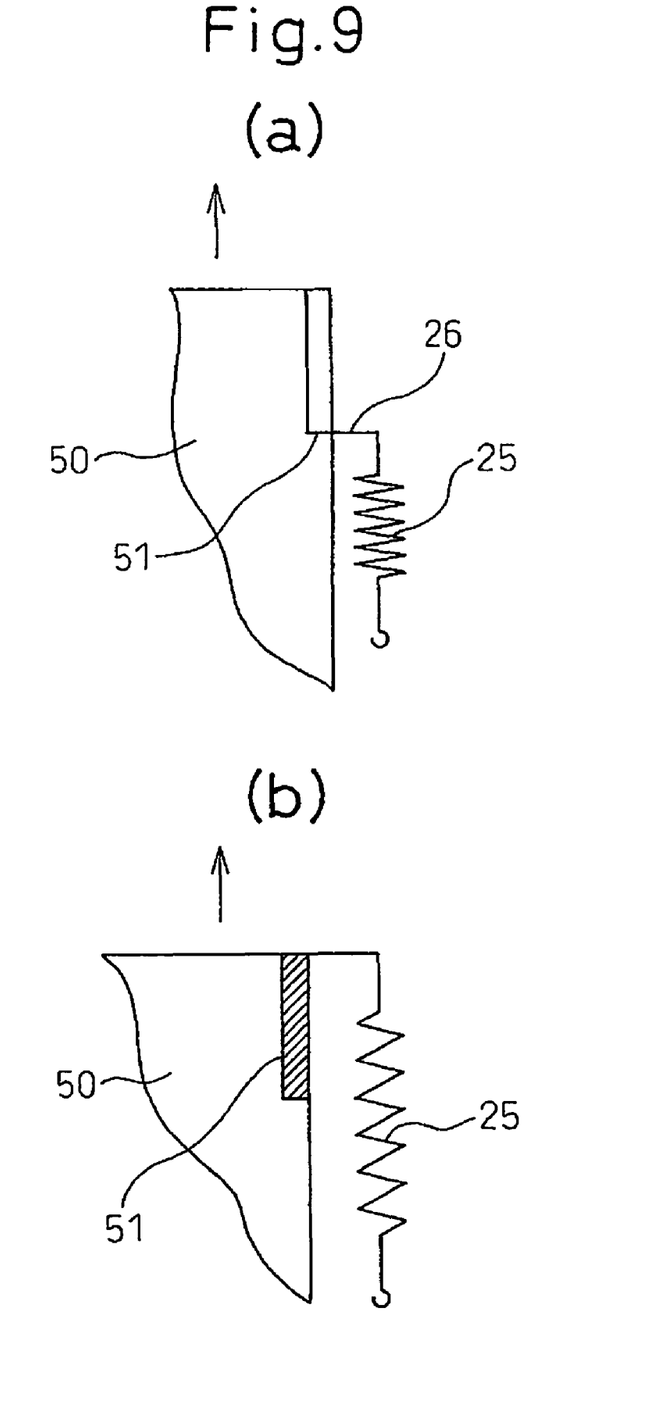

FIGS. 9(*a*) and (*b*) show the relationship between the shutter 51 of a cartridge 50 and a coil spring 25. The arrow marks in the figures show the direction of insertion of the cartridge into the magazine. As shown in FIG. 9(*a*), if the shutter 51 is not faulty, along with the insertion of the cartridge 50 into the magazine 10, the front end 26 of the coil spring will engage with the shutter 51 and open the shutter 51. When the cartridge 60 is inserted to the back of the magazine, the shutter 51 will be completely opened by the coil spring 25. On the other hand, as shown in FIG. 9(b), if the shutter deforms or is otherwise defective, even if the shutter 51 engages with the front end 26 of the coil spring 25, the shutter 51 will not open or even if opening, will only open part way. In that case, the coil spring 25 will stretch following the forward motion of the cartridge 50. Even if the cartridge 50 is inserted to the back of the magazine, the shutter 51 will not completely open.

If all of the shutters 51 are normal, when the cartridge are inserted in the cartridge storing shelves 11, the shutters 51 corresponding to the openings 23 will all open. Therefore, while the cartridges 50 are being inserted, the projection parts 25 of the shutter check door 21 are pushed by the side surfaces of the cartridges 50 and the shutter check door 21 will open, but when the cartridges 50 finish being inserted, the projection parts 24 of the shutter check door 21 will enter the open shutters and the shutter check door 21 will close.

Figure 10:
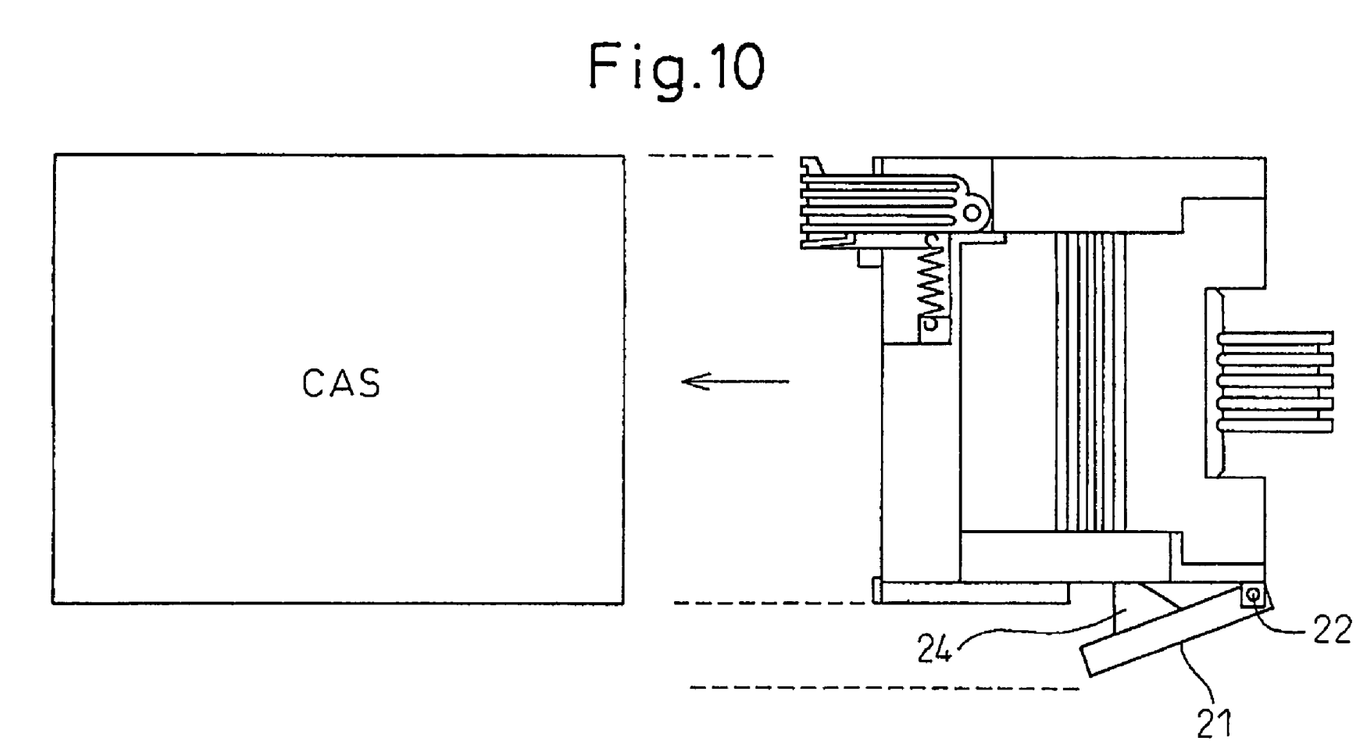
FIG. 10 is a view showing the state where the shutter opening door opens to the outside of the magazine.

However, if even one of the cartridges 50 has a shutter 51 which will not open, the projection 24 of the shutter check door 21 will strike the shutter and, as shown in FIG. 10, the shutter 51 will push against the projection 24, whereby the shutter check door 21 will pivot about its shaft 22 and open to the outside of the magazine 10. The entrances of the CAS's 31 of the tape library apparatus 30 are designed to be sizes enabling the magazines 10 to be set when the shutter check doors 21 are completely closed. Therefore, if a shutter check door 21 is open even slightly, a magazine 10 will not be able to be set in a CAS 31. As a result, the operator can learn of a shutter defect of a cartridge inserted in a magazine.

Figure 11:
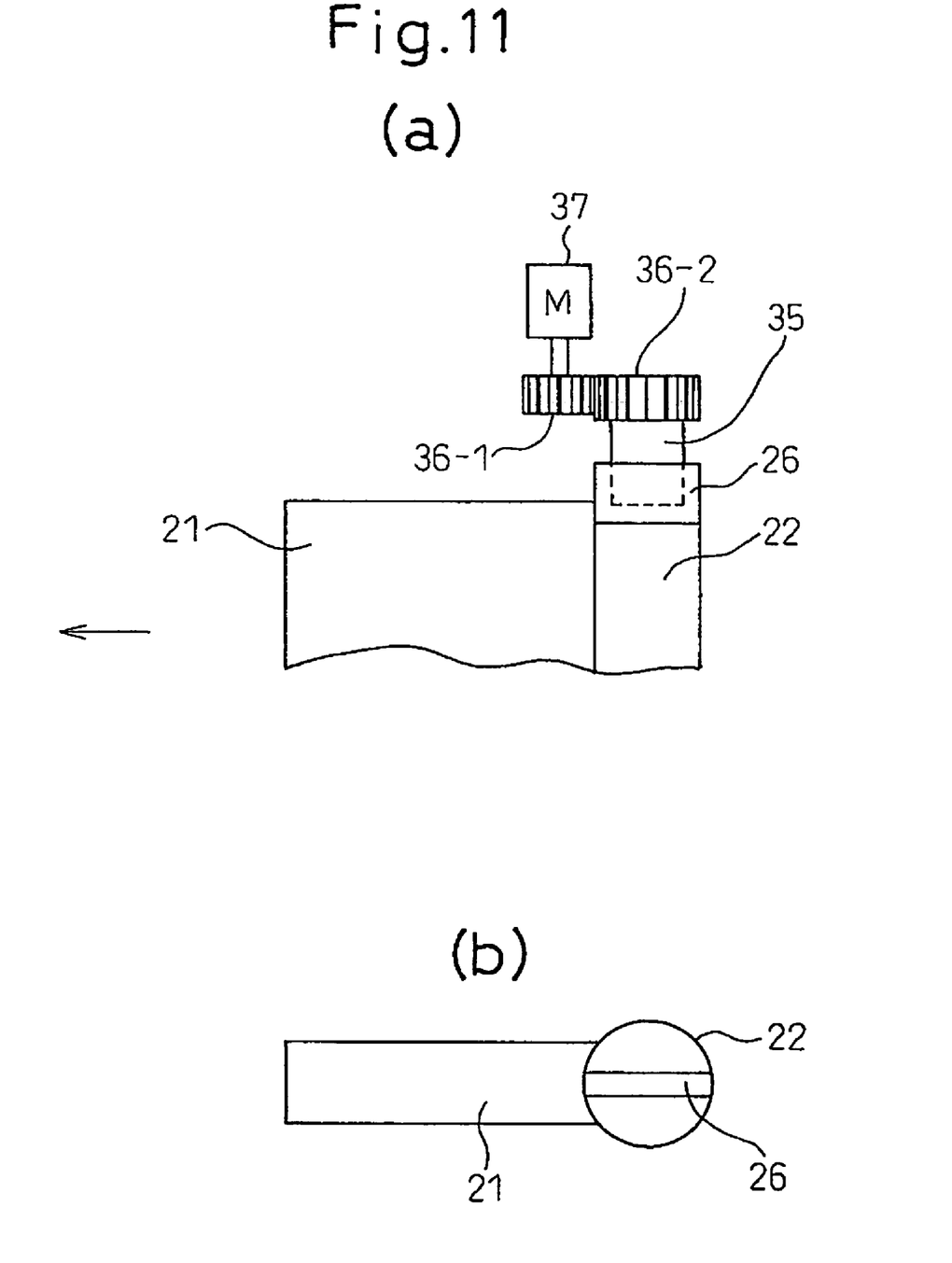
FIG. 11 is a view showing the relationship between the shutter opening door and a pin opening the door.

When the cartridges inserted into a magazine 10 have no defective shutters, the operator can load the magazine 10 into a CAS 31 of the tape library apparatus 30. When the magazine 10 is loaded into the CAS 31, a pin 35 provided at the CAS slides into a groove 26 provided at the top surface of the shaft 22 of the shutter check door arranged at the side surface of the magazine 10. The pin 35 is designed to have the drive force of a motor 37 transmitted to it through gears 36-1, 36-2. When the magazine 10 is completely fit into the CAS 31, the motor 37 operates, rotational force is transmitted through the gears 36-1, 36-2 to the pin, the shaft 22 of the shutter check door 21 is turned, and thereby the door 21 is opened.

Figure 12:
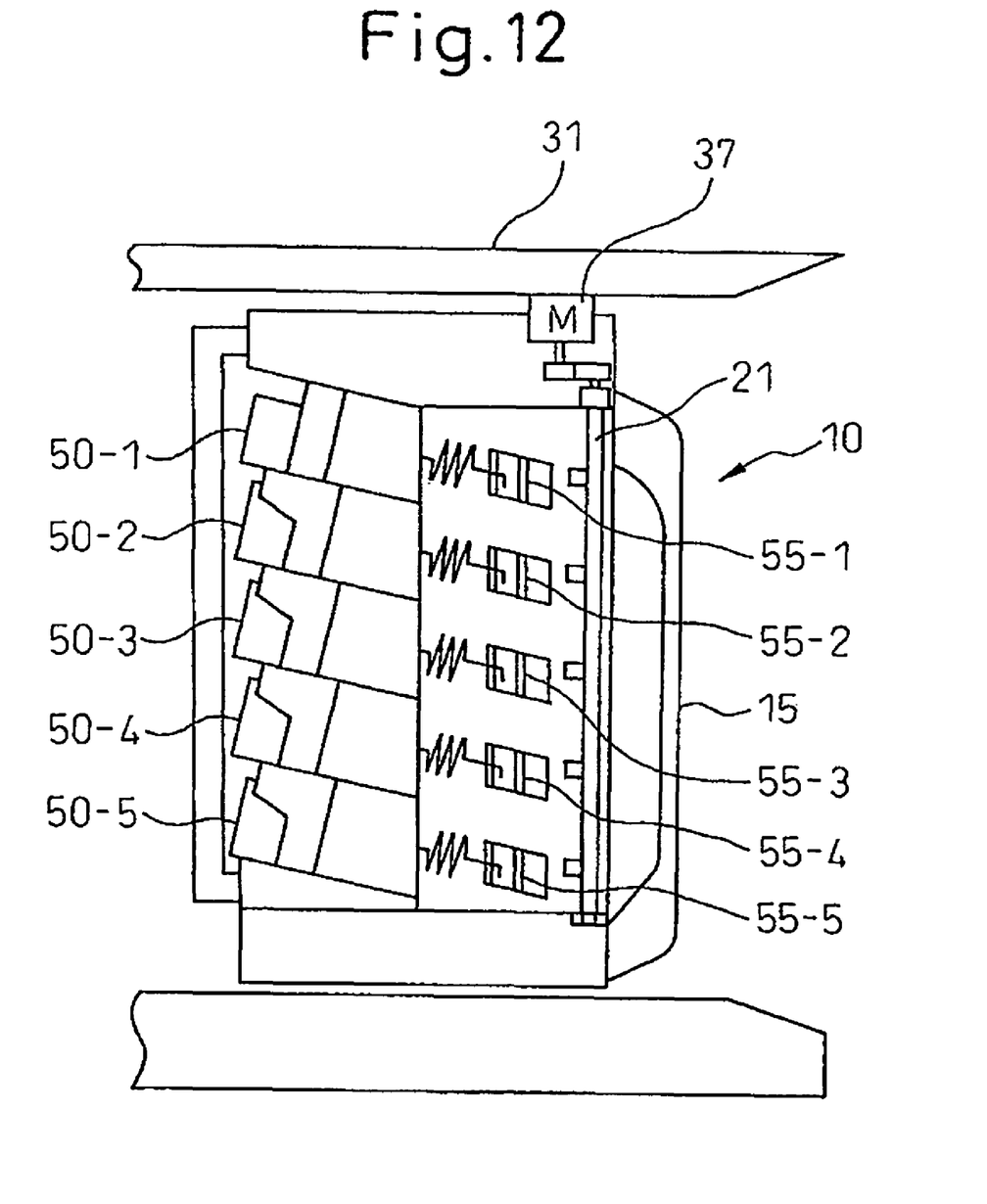
FIG. 12 is a view showing the state where a magazine is set in a CAS and the shutter check door is open.

FIG. 12 shows the state with a magazine 10 set in a CAS 31 and with the motor 37 opening the shutter check door 21. The shutters of the cartridges 50-1 to 50-5 are open, so the leader pins 55-1 to 55-5 are exposed. In this state, the leader pins 55-1 to 55-5 are inspected.

Figure 13:
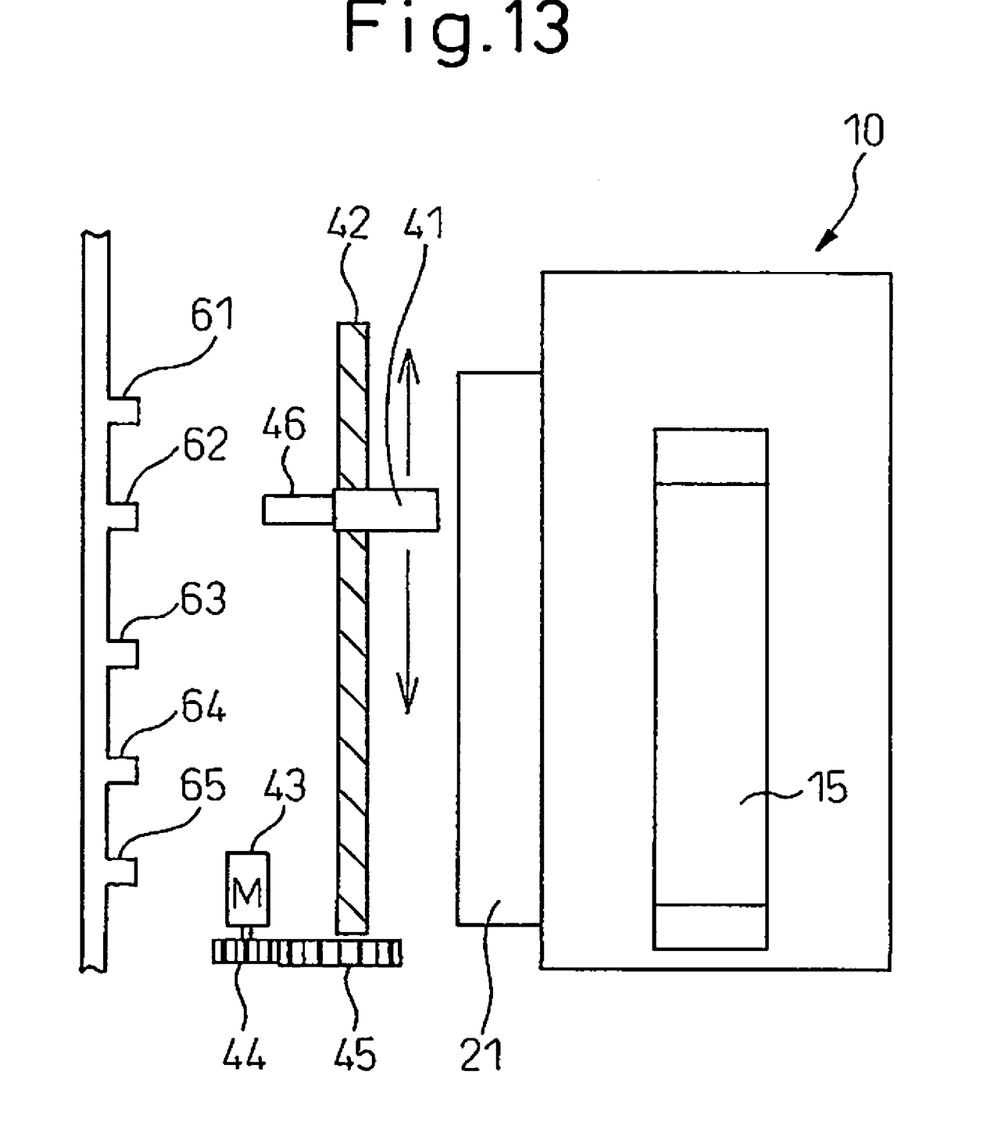
FIG. 13 is a view showing the relationship between a magazine set in a CAS and a CCD camera for inspecting a leader pin.

FIG. 13 is a view showing the relationship between a magazine 10 set in a CAS and a CCD camera 41 for inspecting the leader pins. The CCD camera 41 provided in the CAS 31 is arranged at a position enabling it to capture the images of the leader pins in the state with the shutter check door 21 open. It is moved up and down by a feed screw 42 turned by the drive force of a motor 43 transmitted through gears 44 and 45. Further, a sensor 46 for instructing the picture taking position of the CCD camera 41 is provided at the same position as the CCD camera 41 and moved up and down. Marks 61 to 65 indicating the positions of the leader pins are provided in advance at for example the wall of the CAS 31. The sensor 36 reads these marks 61 to 65 and instructs the CCD camera 41 to take pictures of the leader pins. The CCD camera 41 moves up and down by the feed screw 42 and takes pictures of the leader pins by signals from the sensor 46 showing the positions of the leader pins. The captured pictures are compared with for example reference pictures to judge if the leader pins are normally fastened to the cartridges. If the leader pins are normal, the shutter check door 21 is closed and a conveyance robot is used to convey the cartridges to the cells in which they are to be housed and they are stored in the cells.

If detachment of a leader pin is detected from the results of the CCD camera, the operator is notified of which cartridge is abnormal by for example a liquid crystal display panel provided at the operator panel 33, the conveyance operation is stopped, and the magazine 10 is made removable by closing the shutter check door. The operator can open the door of the CAS 31, take out the magazine 10, and replace the defect cartridge with a new cartridge.

Note that in the present embodiment, the shutter check door was opened by rotating a pin engaged with the shaft of the door by a motor, but this is just an example. The door can be opened and closed using any other opening/closing means as well. Further, in the inspection of the leader pins, instead of a CCD camera, a reflection type photosensor may also be used. The position of the sensor for confirming the positions of the leader pins need not be at the opposite side from the CCD camera and may be anywhere. Furthermore, it is not necessary to use a position check sensor. It is also possible to determine the picture taking position from height information of the positions of the cartridge storing shelves of the magazine.

In this way, when setting cartridges in a magazine and setting the magazine in a CAS of a library apparatus, shutter defects and leader pin defects can be detected, so unlike in the past where defects were only first detected after setting the magazine in the tape drive, defective cartridges can be discovered early.

Note that the shutters are opened at the stage when the cartridges are inserted into the magazine and subsequently remain open until the cartridges are taken out from the magazine by the conveyance robot, but up until being set in the main body, they are covered by the shutter check door. When set in the main body, the shutter check door is opened for a short time to allow operation of the CCD camera, but if normal, the cartridges are immediately taken out from the magazine to be conveyed to the cells. The shutters close at this time, so there is no particularly problem.

Further, in the present embodiment, cartridges using tape were employed as the storage media, but the present invention is not limited to tape cartridges and may also be applied to cartridges using opto, magnetic, and magneto-optic disks or other storage media.

Furthermore, in the present embodiment, shutter defects were confirmed by using the shutter check door, but all shutters open upon the insertion of cartridges into a magazine, so if making the side wall of the magazine corresponding to the shutters transparent, even opening/closing of the shutters can be confirmed without using a shutter check door.

The invention claimed is:

1. A cartridge magazine comprising:
    a plurality of holding shelves holding a plurality of cartridges storing storage media and having shutters for accessing the storage media;
    a shutter opening mechanism attached to each holding shelf for opening the shutter along with insertion of a cartridge; and
    a shutter check member having projection parts projecting out into spaces formed by the opening of the shutters.

2. The cartridge magazine as set forth in claim 1, wherein the shutter opening mechanism has an engagement member biased elastically in the opposite direction to the insertion of said cartridge, said engagement member engaging said shutter to open the shutter.

3. A cartridge library apparatus including cartridge magazines which enables cartridges to be loaded and unloaded, each cartridge magazine comprising a plurality of holding shelves holding a plurality of cartridges storing storage media and having shutters for accessing the storage media, and a shutter opening mechanism attached to each holding shelf for opening a shutter along with insertion of a cartridge, the cartridge library apparatus comprising:

cartridge access units in which the cartridge magazines are loaded and having inspecting means for inspecting the insides of the cartridges through the opened shutters by noncontact means;

a plurality of storage units for storing the cartridges;

at least one drive unit for reading and writing data from and to data storage media in the cartridges; and a conveyor unit for conveying the cartridges from the cartridge access units to the storage units and from the storage units to the drive unit, wherein each cartridge magazine further has a shutter check member having projection parts projecting out into spaces formed by the opening of the shutters, and each cartridge access unit is configured to prevent loading of the cartridge magazine, when even one shutter cannot be opened, by the nonopening shutter striking a projection part and the shutter check member thereby opening.

4. The cartridge library apparatus as set forth in claim 3, wherein each cartridge access unit further comprises a shutter check member opening means for opening the shutter check member of the loaded cartridge magazine, and the inspecting means inspects the insides of the cartridges by noncontact means after the shutter check member is opened.

5. The cartridge library apparatus as set forth in claim 4, where the shutter check member opening means opens the shutter check member by a pin member provided at the cartridge access unit being inserted into a groove of a shaft of the shutter check member and the pin member being rotated.

6. The cartridge library apparatus as set forth in claim 3, wherein the inspecting means has a charge-coupled device (CCD) camera or reflection type sensor.

7. The cartridge library apparatus as set forth in claim 5, where the inspecting means further comprises an inspection position determining means for determining an inspection position and inspects the insides at positions determined by the inspection position determining means.

\* \* \* \* \*